(12) United States Patent
Kuroda et al.

(10) Patent No.: US 7,706,224 B2
(45) Date of Patent: *Apr. 27, 2010

(54) INFORMATION RECORDING MEDIUM, INFORMATION READING APPARATUS AND INFORMATION RECORDING APPARATUS

(75) Inventors: Kazuo Kuroda, Tokorozawa (JP); Shoji Taniguchi, Tokorozawa (JP); Yoshiaki Moriyama, Tokorozawa (JP)

(73) Assignee: Pioneer Corporation, Meguro-Ku, Tokyo (JP)

( * ) Notice: Subject to any disclaimer, the term of this patent is extended or adjusted under 35 U.S.C. 154(b) by 355 days.

This patent is subject to a terminal disclaimer.

(21) Appl. No.: 11/723,374

(22) Filed: Mar. 19, 2007

(65) Prior Publication Data

US 2007/0159941 A1 Jul. 12, 2007

Related U.S. Application Data

(62) Division of application No. 10/242,673, filed on Sep. 13, 2002, now abandoned.

(30) Foreign Application Priority Data

Sep. 14, 2001 (JP) ............................ P2001-279396
Dec. 12, 2001 (JP) ............................ P2001-378873

(51) Int. Cl.
G11B 7/00 (2006.01)
(52) U.S. Cl. ................................. 369/47.38; 369/47.19
(58) Field of Classification Search ................ 369/47.38
See application file for complete search history.

(56) References Cited

U.S. PATENT DOCUMENTS

| 5,572,502 | A | * | 11/1996 | Naruse et al. ............... 369/116 |
| 5,724,327 | A | | 3/1998 | Timmermans et al. |
| 5,867,475 | A | | 2/1999 | Moriya et al. |
| 5,917,910 | A | | 6/1999 | Ishiguro et al. |
| 5,933,410 | A | | 8/1999 | Nakane et al. |
| 6,191,902 | B1 | | 2/2001 | Hashimura et al. |
| 6,331,969 | B1 | | 12/2001 | Kobayashi et al. |
| 6,370,320 | B1 | * | 4/2002 | Sugita et al. ................. 386/94 |
| 6,445,656 | B1 | | 9/2002 | Koide |
| 6,542,443 | B1 | * | 4/2003 | Huber ..................... 369/13.02 |
| 6,587,948 | B1 | | 7/2003 | Inazawa et al. |
| 6,665,240 | B1 | | 12/2003 | Kobayashi et al. |
| 6,687,205 | B1 | | 2/2004 | Huber |
| 6,697,306 | B2 | * | 2/2004 | Sako ....................... 369/47.12 |
| 6,723,160 | B2 | | 4/2004 | Mackey et al. |
| 6,735,160 | B1 | * | 5/2004 | Miyashita et al. ......... 369/59.12 |
| 6,788,643 | B2 | | 9/2004 | Miyamoto et al. |

(Continued)

FOREIGN PATENT DOCUMENTS

EP 1 255 246 11/2002

(Continued)

Primary Examiner—Wayne Young
Assistant Examiner—Van N Chow
(74) Attorney, Agent, or Firm—Drinker Biddle & Reath LLP

(57) ABSTRACT

In an information recording medium, positions of pits are modulated in a direction intersecting a direction of reading of pits, so that a predetermined information is recorded. In this information recording medium, the whole of the predetermined information or a part of the predetermined information is randomized through the used of spread spectrum.

17 Claims, 11 Drawing Sheets

U.S. PATENT DOCUMENTS

| | | |
|---|---|---|
| 6,791,926 B1 | 9/2004 | Furumiya et al. |
| 7,020,062 B2 | 3/2006 | Kuroda et al. |
| 2001/0017828 A1* | 8/2001 | Yamada .................... 369/47.12 |
| 2002/0067678 A1 | 6/2002 | Jeon et al. |
| 2003/0012099 A1* | 1/2003 | Sako et al. ................ 369/47.23 |
| 2004/0240524 A1* | 12/2004 | Malvar et al. ................ 375/130 |
| 2004/0257971 A1 | 12/2004 | Nishimoto et al. |
| 2006/0114767 A1 | 6/2006 | Kuroda et al. |

FOREIGN PATENT DOCUMENTS

| | | |
|---|---|---|
| JP | 57-158050 | 9/1998 |
| JP | 11-306675 | 11/1999 |
| JP | 2000-195049 | 7/2000 |
| JP | 2001-216650 | 8/2001 |
| WO | 96/27191 | 9/1996 |
| WO | 00/45381 | 8/2000 |

* cited by examiner

FIG. 6A
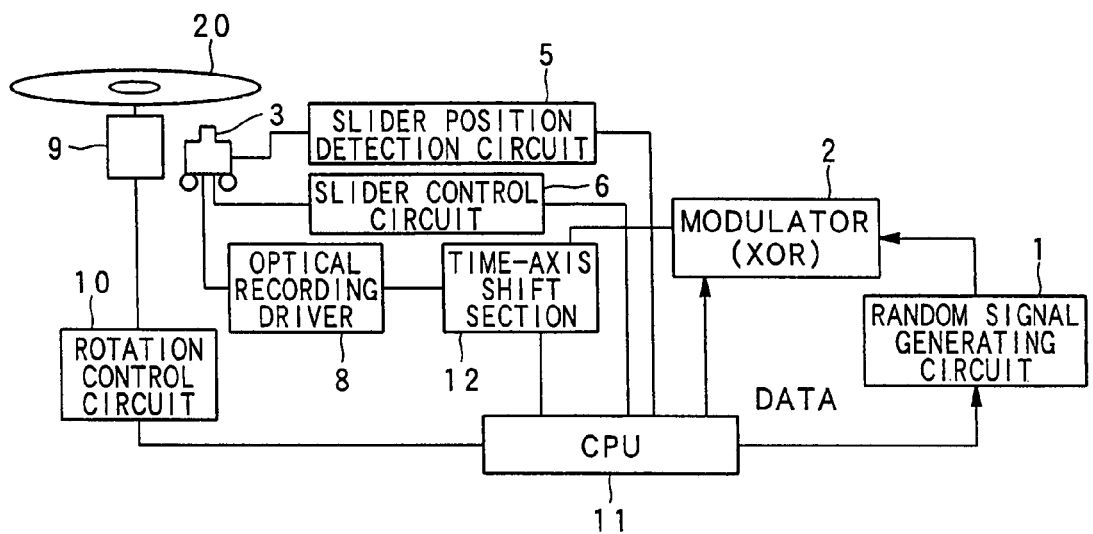
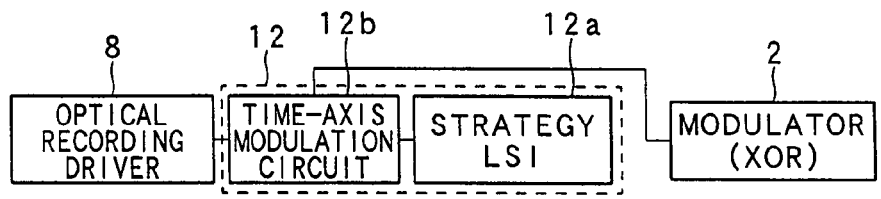
FIG. 6B
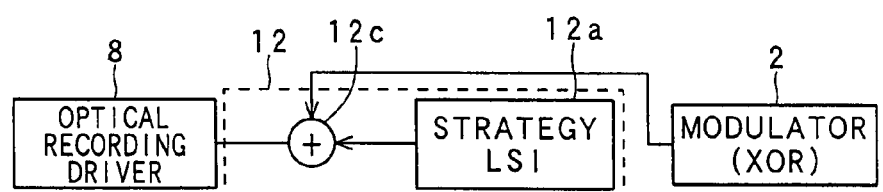
FIG. 6C
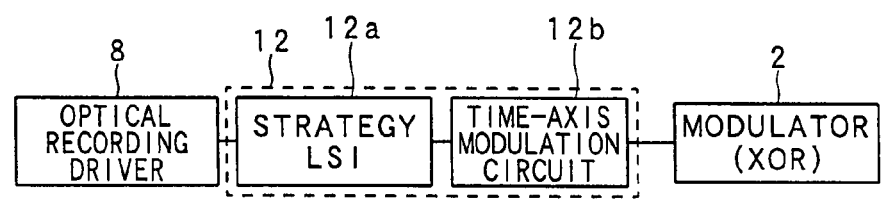
FIG. 6D

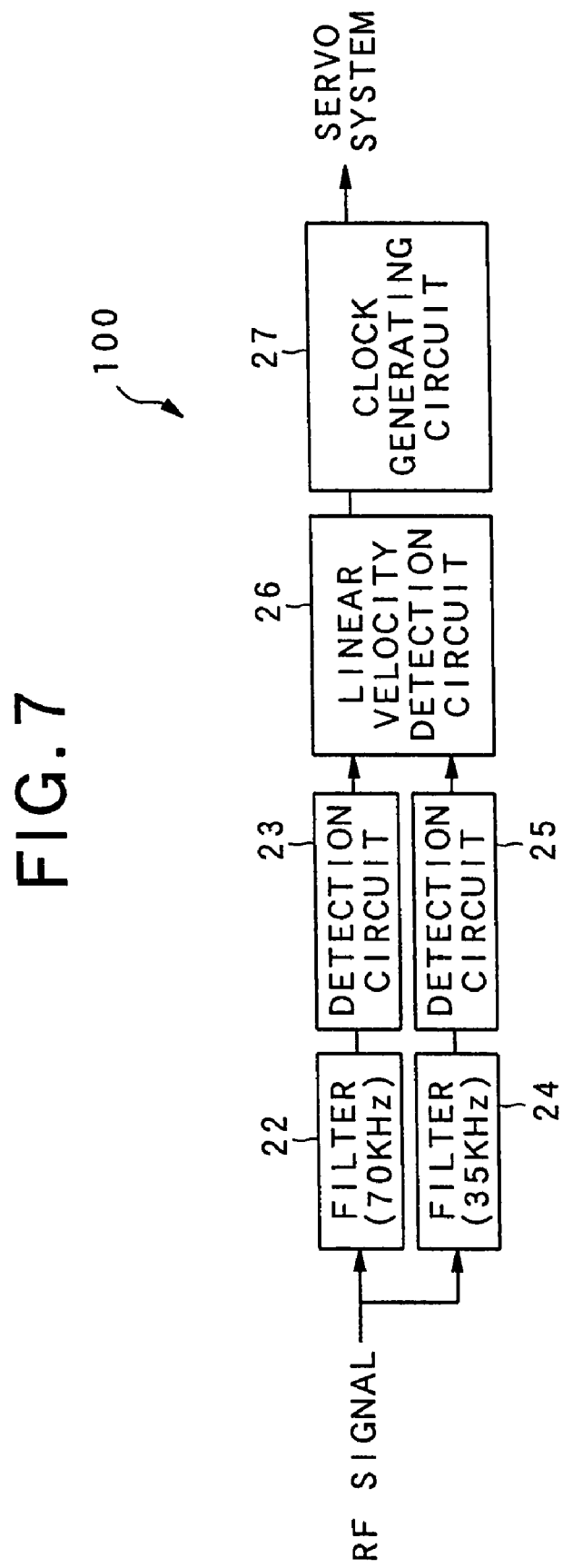

$L = M + (N1 + N2) / 2$

INFORMATION RECORDING MEDIUM, INFORMATION READING APPARATUS AND INFORMATION RECORDING APPARATUS

This is a divisional application of application Ser. No. 10/242,673, filed on Sep. 13, 2002 now abandoned, which is incorporated by reference herein in its entirety.

BACKGROUND OF THE INVENTION

1. Field of the Invention

The present invention relates to an information recording medium in which information is recorded as recording marks such as pits.

2. Description of the Related Art

Currently, an optical disk typified by a CD and a DVD has been put into practice. In the optical disk, information is recorded as the length of pits. However, there is the desire to reserve different recording space without reducing recording space for pits, for example, in order to record information for copy control for the sake of inhibiting illegal copy, etc.

A proposal to vary positions of pits in the radius direction of the optical disk is presented as a method of increasing recording space by a means except the one of using the length of pits. In this technique, the positions of pits is wobbled in the radius direction of the optical disk, and then in formation is recorded by means of FM modulating the wobble.

However, when reproducing a wobble signal recorded by means of varying the positions of pits, crosstalk and so on enters the wobble signal. The crosstalk is caused by wobble from an adjacent track or an RF signal recorded by means of the length of pits. Hence, the wobble signal has a degraded CN (Carrier to Noise ratio), a problem occurs on reading of address information recorded by FM modulation and so on, and the reference signal extracted from the wobble signal becomes inaccurate. Further, in the case of a multilayer disk as well, the same problem results from crosstalk of a wobble signal between layers. Hence, it is difficult to accurately perform writing in the multilayer disk.

As described above, in the conventional method, since a frequency for recording leans to a specific one (wobbling frequency), when the track is affected by noise and crosstalk, it is difficult to detect a signal with accuracy.

SUMMARY OF THE INVENTION

The present invention has as its object of the provision of an information recording medium wherein information is recorded as the positions of recording marks such as pits, which can eliminate the influence of noise such as crosstalk to recorded information, and an information reading apparatus for reading information from the information recording medium, and so on.

The above object of the present invention can be achieved by an information recording medium in which positions of recording marks are modulated in a predetermined direction and a predetermined information is recorded as variation of the positions, wherein at least a part of the predetermined information is randomized.

According to the above information recording medium, since at least a part of the predetermined information is randomized, it is possible to remarkably suppress the influence of crosstalk and various kinds of noises from an adjacent track, and at the same time, it is possible to remarkably reduce the influence on the other tracks. Therefore, it is possible to effectively eliminate the influence of noise of crosstalk and the like.

The positions of recording marks may be modulated in a direction intersecting a direction of reading of the recording marks.

According to the above information recording medium, since at least a part of the predetermined information is randomized, it is possible to remarkably suppress the influence of crosstalk and various kinds of noises from an adjacent track, and at the same time, it is possible to remarkably reduce the influence on the other tracks. Therefore, it is possible to effectively eliminate the influence of noise of crosstalk and the like.

The positions of recording marks may be modulated in a direction of reading of the recording marks.

According to the above information recording medium, since at least a part of the predetermined information is randomized, it is possible to remarkably suppress the influence of crosstalk and various kinds of noises from an adjacent track, and at the same time, it is possible to remarkably reduce the influence on the other tracks. Therefore, it is possible to effectively eliminate the influence of noise of crosstalk and the like. In addition, since it is impossible to copy the whole of or a part of the predetermined information by RF copying, an illegal copy can be prevented securely.

The predetermined information may be randomized by using a randomizing pattern.

In this case, the influence of noise such as crosstalk can be effectively eliminated by using a plurality of randomizing patterns and frequently switching the randomizing patterns. When the randomizing patterns on adjacent tracks are different from each other, it will be more effective.

The predetermined information may be randomized by changing in a short period a fundamental frequency of a signal used for spread spectrum.

In this case, the influence of noise such as crosstalk can be eliminated more effectively by switching reference frequencies such that adjacent tracks are different in fundamental frequency of a signal used for spread spectrum.

A part of the predetermined information may not be randomized.

In this case, based on a part of the track that is not randomized, necessary information such as information indicating a synchronizing signal and a track can be quickly and readily obtained without using a complicated circuit and so on.

Different modulation factors may be used between a part corresponding to the randomized information and the other part corresponding to information not being randomized.

In this case, the information of the part can be positively read by increasing a wobbling amplitude on a part to be suppressed in influence of crosstalk and noise from other tracks.

A modulation factor of the other part corresponding to the information not being randomized may be larger than that of the part corresponding to the randomized information.

In this case, information such as a synchronizing signal that is recorded in the part not being randomized can be positively obtained without using a complicated circuit and so on.

The randomized information may include a randomized specific synchronizing signal.

In this case, a randomized specific synchronizing signal is read and compared with a specific synchronizing signal, so that it is possible to detect a method of randomizing, such as a randomizing pattern.

The randomized information may further include substantial data that is randomized with the same randomizing pattern as that of the randomized specific synchronizing signal.

In this case, since it is possible to detect a method of randomizing such as a randomizing pattern by comparing the randomized specific synchronizing signal with the specific synchronizing signal, the randomized recording information can be restored by using the same randomizing pattern.

The randomized information may include a randomized synchronizing signal and substantial data that is randomized with a randomizing pattern indicated by the randomized synchronizing signal.

In this case, since it is possible to determined a randomizing pattern indicated by the randomized synchronizing signal, the substantial data can be restored.

The randomizing pattern may be different between adjacent tracks.

In this case, when information is restored, since crosstalk components from an adjacent track are largely suppressed, the influence between adjacent tracks can be reduced more effectively.

The predetermined information may be randomized by using signals having different fundamental frequencies between adjacent tracks.

In this case, when information is restored, since crosstalk components from an adjacent track are largely suppressed, the influence between adjacent tracks can be reduced more effectively.

The predetermined information may be divided into units each having a time length of a predetermined period, and the same randomizing pattern is used in each unit.

In this case, since the same randomizing pattern is used for each unit, it is not necessary to switch a changing method for each unit when information recorded in a track is restored.

The predetermined information may be divided into units each having a time length of a predetermined period, and the signal having the same fundamental frequency is used in each unit.

In this case, since an equal fundamental frequency may be used for each unit, it is not necessary to switch a fundamental frequency in each unit when information recorded in a track is restored. The unit may be an ECC block.

In this case, the same randomizing pattern or an equal fundamental frequency is used in each ECC block. Thus, it is not necessary to switch a changing method or a fundamental frequency in each ECC block when information recorded in a track is restored.

The unit may be equal to a data error correction unit of a recording mark.

In this case, the same randomizing pattern or an equal fundamental frequency is used in each data error correction unit. Thus, it is not necessary to switch a changing method or a fundamental frequency in each unit when information recorded in a track is restored.

Two or more kinds of randomizing patterns may be used with different occupied bands, and randomizing patterns with different occupied bands may be used between adjacent tracks.

In this case, occupied bands of used randomizing patterns are different between adjacent tracks. Hence, the influence between adjacent tracks can be suppressed more effectively.

The randomized recording information may include a synchronizing signal and copy control information. The recording mark may be a pit In an information reading apparatus of the present invention, for reading information recorded in an information recording medium, positions of recording marks are modulated in a predetermined direction; a predetermined information is recorded as variation of the positions; at least a part of the predetermined information is randomized; and the predetermined information has a marker not randomized. In addition, the information reading apparatus is provided with: a reading device for reading positions of the recording marks; a linear velocity measuring device for measuring a linear velocity of the information recording medium based on a pattern width of the marker not randomized in a direction of reading of the marker.

According to the above information reading apparatus, since reading linear velocity is measured based on a pattern width of the marker not randomized in the direction of reading of the marker, a correct linear speed can be computed based on a waveform of a marker deformed by the influence of crosstalk and noise.

The positions of recording marks may be modulated in a direction intersecting a direction of reading of the recording marks.

According to the above information reading apparatus, since reading linear velocity is measured based on a pattern width of the marker not randomized in the direction of reading of the marker, a correct linear speed can be computed based on a waveform of a marker deformed by the influence of crosstalk and noise.

The positions of recording marks may be modulated in a direction of reading of the recording marks.

According to the above information reading apparatus, since reading linear velocity is measured based on a pattern width of the marker not randomized in the direction of reading of the marker, a correct linear speed can be computed based on a waveform of a marker deformed by the influence of crosstalk and noise.

The information reading apparatus may further be provided with an information reproducing device for reproducing the predetermined information recorded in the information recording medium. In addition, the information reproducing device may have a signal processing device for processing a signal by using a clock according to a linear velocity measured by the linear velocity measuring device.

In this case, the information reproducing device can perform signal processing using an accurate clock based on a correct linear velocity.

The information reading apparatus may further be provided with an information recording device for recording information in the information recording medium. In addition, the information recording device may have a signal processing device for processing a signal by using a clock according to a linear velocity measured by the linear velocity measuring device.

In this case, the information recording device can perform signal processing using an accurate clock based on a correct linear velocity.

The randomized information may include randomized specific synchronizing signals. In addition, the apparatus may further be provided with: a randomizing signal output device for randomizing specific synchronizing signals by using a plurality of randomizing patterns and outputting a plurality of randomized signals; a comparing device for comparing a plurality of randomized signals outputted from the randomizing signal output device and randomized specific synchronizing signals included in the randomized information. Further, the comparing device may determine a randomizing pattern used for randomizing of the randomized specific synchronizing signal based on the compared result.

In this case, since a randomizing pattern is positively determined by comparing a plurality of randomizing signals outputted from the randomizing signal output device and the randomized specific synchronizing signal, information related to the specific synchronizing signal can be restored by using the randomizing pattern.

In an information recording apparatus of the present invention, for recording a predetermined information in an information recording medium, the apparatus is provided with: a randomizing signal generating device for generating a randomizing signal for randomizing at least a part of the predetermined information; a modulating device for modulating at least a part of the predetermined information based on the randomizing signal; a recording device for varying a position of a recording mark in a predetermined direction based on an output from the modulating device and recording the information in the information recording medium.

According to the above information recording medium, since at least a part of the predetermined information is randomized, it is possible to remarkably suppress the influence of crosstalk and various kinds of noises from an adjacent track, and at the same time, it is possible to remarkably reduce the influence on the other tracks. Therefore, it is possible to effectively eliminate the influence of noise of crosstalk and the like. In addition, since it is impossible to copy the whole of or a part of the predetermined information by RF copying, an illegal copy can be prevented securely.

The recording device may vary the position of the recording mark in a direction intersecting a direction of reading of the recording marks.

According to the above information recording medium, since at least a part of the predetermined information is randomized, it is possible to remarkably suppress the influence of crosstalk and various kinds of noises from an adjacent track, and at the same time, it is possible to remarkably reduce the influence on the other tracks. Therefore, it is possible to effectively eliminate the influence of noise of crosstalk and the like. In addition, since it is impossible to copy the whole of or a part of the predetermined information by RF copying, an illegal copy can be prevented securely.

The recording device may vary the position of the recording mark in a direction of reading of the recording marks.

According to the above information recording medium, since at least a part of the predetermined information is randomized, it is possible to remarkably suppress the influence of crosstalk and various kinds of noises from an adjacent track, and at the same time, it is possible to remarkably reduce the influence on the other tracks. Therefore, it is possible to effectively eliminate the influence of noise of crosstalk and the like. In addition, since it is impossible to copy the whole of or a part of the predetermined information by RF copying, an illegal copy can be prevented securely.

The predetermined information may include a marker indicating a track, and the modulating device may modulate information except the marker based on the randomizing signal.

According to the above information reading apparatus, since reading linear velocity is measured based on a pattern width of the marker not randomized in the direction of reading of the marker, a correct linear speed can be computed based on a waveform of a marker deformed by the influence of crosstalk and noise.

The information recording apparatus may further be provided with a switching device for switching the randomizing signal generated by the randomizing signal generating device at a short period.

In this case, the influence of noise such as crosstalk can be effectively eliminated by frequently switching the randomizing patterns. When the randomizing patterns on adjacent tracks are different from each other, it will be more effective.

It is noted that in this specification, the scope of the meaning of "recording mark" is so broad that "recording mark" includes a pit, an emboss, a mark formed by irradiating a light beam to a phase change material layer, a mark for recording information through the use of optical transmittance or optical reflectance.

BRIEF DESCRIPTION OF THE DRAWINGS

FIG. 6 is a block diagram showing the configuration of a disk cutting machine for manufacturing a master disk in a second embodiment;

FIG. 7 is a block diagram showing the configuration of a reading apparatus in the second embodiment;

DETAILED DESCRIPTION OF THE PREFERRED EMBODIMENTS

The following will discuss embodiments of an information recording medium, information reading apparatus, and information recording apparatus, according to the present invention.

First Embodiment

First, referring to FIGS. 1 to 5, the following will discuss a first embodiment of an information recording medium according to the present invention.

Figure 1:
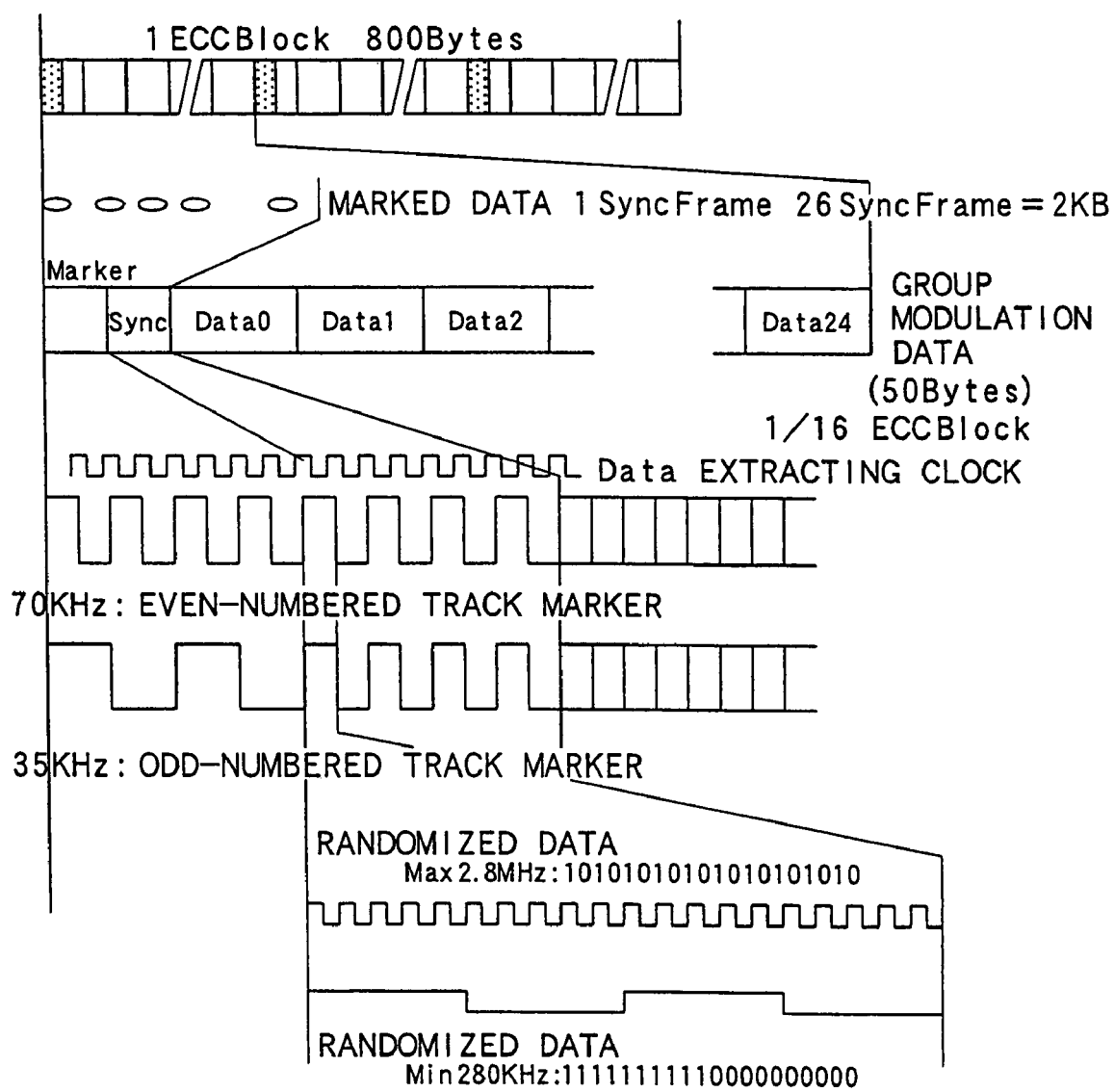
FIG. 1 is a diagram showing a signal format of an optical disk, which is an information recording medium in a first embodiment.

FIG. 1 is a diagram showing a signal format of an optical disk, which is an information recording medium of the present embodiment. As shown in FIG. 1, the data of the present embodiment comprises a marker (Marker) and a synchronizing signal (Sync) that are included in a single synchronizing frame, and substantial data (Data 0 to 24) composed of 25 synchronizing frames in each ECC (error correction) block composed of 26 synchronizing frames. In the data, the synchronizing signal and substantial data except the marker are randomized based on a predetermined random signal, and are each recorded as variation of the positions of pits in the radius direction (a direction orthogonal to the direction of a pit reading) of a disk, that is, in the radius direction of the disk against a track formed in a spiral fashion. For example, when a pit is positioned inside a track (in the direction of a center of the disk from the track), a mark "0" is assigned. When a pit is positioned outside the track (in the direction of the outer regions of the disk from the track), a mark "1" is assigned.

It is noted that pit (recording mark) for recording predetermined RF information (e.g., video information and voice information) is formed as the length of pits with a light beam on the track.

As shown in FIG. 1, a 70-kHz track marker is located in a marker of groove modulation data corresponding to an even-numbered track. On the other hand, a 35-kHz track marker is located in a marker of groove modulation data corresponding to an odd-number track.

A 70-kHz synchronizing signal having a specific data pattern is located in the synchronizing signal. In the present embodiment, synchronizing signals (signals before randomization) are the same for all the tracks. The same data "10101010" is used for both of an even-numbered track and an odd-numbered track.

There are an address signal indicating an address of each track and error correction code in the data. It is noted that information of the data is, for example, copy control information for inhibiting illegal copy of the RF information. As the copy control information, there are a key which becomes a necessity for removing copy prohibition, information indicating whether copy is allowed or not (e.g., copy available without limitation, only one time copy, copy prohibition), and so on.

It is noted that information of the data may be an address signal indicating an address of each track and the information the data is not limited to a specific information.

Next, the following will discuss a method for randomizing with respect to a synchronizing signal and a data signal. As shown in FIG. 1, in the present embodiment, only a synchronizing signal and a data signal are randomized by spread spectrum system. Namely, by multiplying (XOR) a synchronizing signal and a data signal from DC (direct current) that have 140-kHz spectrum and a random signal having a band of 280 kHz to 2.8 MHz, a synchronizing signal and a data signal are spread from 280 kHz to 2.8 MHz. During reproduction, an original signal is recovered by multiplying the same random signal, so that a synchronizing signal and a data signal of 140 kHz can be restored from DC (direct current). In this manner, in the present embodiment, a random signal of 280 kHz to 2.8 MHz is multiplied during recovery, so that noise and crosstalk that are added to a signal before recovery is separated from a band (DC to 140 kHz) of a synchronizing signal and a data signal to the outside. Therefore, it is possible to largely reduce the influence of noise and crosstalk.

In the present embodiment, four kinds of randomizing patterns (series of random functions) are used in total. A synchronizing signal and a data signal in each ECC block are each randomized by using a common randomizing pattern of four randomizing patterns. In the present embodiment, a randomizing pattern of each ECC block is selected such that adjacent tracks have different randomizing patterns as much as possible. Thus, crosstalk between adjacent tracks can be reduced more effectively. Besides, in the present specification, "adjacent tracks" indicate tracks at a position causing crosstalk that includes adjacent tracks in the same layer or tracks formed substantially in the same area of adjacent layers, regarding a recording medium with a single layer or multiple layers.

As described above, in the present embodiment, when the positions of pits is modulated in a radius direction of the disk, spread spectrum system is used, a data signal including an error correction signal is modulated by a specific random signal, and the data is modulated by the signal. As a result, the data recorded as the positions of pits is randomly modulated.

During reproduction, demodulation is performed by using a specific random signal from a reproduced push-pull signal so as to remove noise entering from an adjacent track and take out a data signal. In the event of an error, correction is made by an error correction signal in the ECC block so as to obtain more correct data as compared with the conventional art.

The kind of a random signal is not limited to the above, so that any kind of signal can be selected as a random signal. However, it is desirable to frequently switch a plurality of random signals such that random signals used for data in adjacent tracks are different from each other. In this case, as described above, crosstalk between adjacent tracks can be reduced more effectively.

In the embodiment, a track marker is recorded as the positions of pits. However, a track maker may be recorded through the use of the length of pits or wobbling of a track itself. A track maker may be omitted. In this case, it is possible to generate a synchronizing signal and so on through the use of detected signals of pits in which data is recorded.

In the present invention, only a synchronizing signal and a data signal are randomized and recorded. A track marker is recorded without randomization. Thus, a circuit is not complicated in an information recorder for recording information in an optical disk or in an information reproducing device for reproducing information recorded in an optical disk. However, all data including a track marker may be randomized and recorded.

Moreover, when a track marker is not randomized, in order to increase accuracy of reading on a marker not being randomized, it is more effective to raise a modulation factor (amplitude factor) of a groove on the part.

Figure 2:
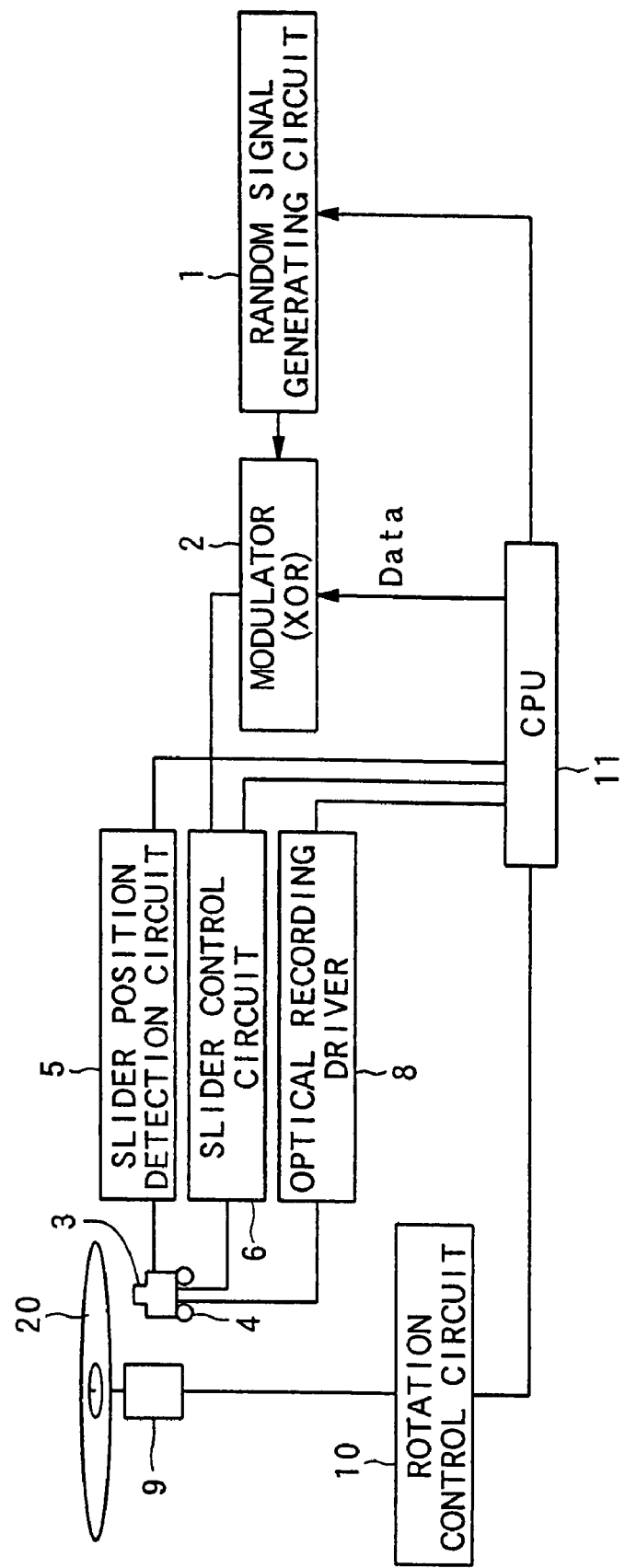
FIG. 2 is a block diagram showing the configuration of a disk cutting machine for manufacturing a master disk in the first embodiment.

Referring to FIG. 2, the following will discuss the configuration of a disk cutting machine for manufacturing a master disk.

As shown in FIG. 2, the cutting machine is provided with: a random signal generating circuit 1 for generating a random signal; a modulator 2 for multiplying a synchronizing signal and a data signal having the above-mentioned signal format by a random signal; a recording head 3 for forming grooves on a master optical disk 20; a slider 4 for driving the recording head 3 in a radius direction of the disk; a slider position detection circuit 5 for detecting a position of the recording head 3 in a radius direction of the disk; a slider control circuit 6 for controlling a sliding position of the slider 4; an optical recording driver 8 for controlling laser light emitted from the recording head 3; a drive 9 for rotatably driving the master disk; a rotation control circuit 10 for controlling the drive 9; and a CPU 11 for controlling the random signal generating circuit 1; the modulator 2; the slider position detection circuit 5; the slider control circuit 6; the optical recording driver 8; and the rotation control circuit 10.

As shown in FIG. 2, a track maker to be recorded in the Marker, a synchronizing signal to be recorded in the Sync, and substantial data to be recorded in the Data are outputted to the modulator 2 via the CPU 11. Meanwhile, the random signal generating circuit 1 generates a random signal having a band of 280 kHz to 2.8 MHz and outputs the signal to the modulator 2.

In the modulator 2, the data outputted from the CPU 11 is multiplied by a random signal as necessary, which is outputted from the random signal generating circuit 1. As described above, in the present embodiment, only a synchronizing signal and a data signal are multiplied by a random signal before randomization.

An output signal of the modulator 2 is inputted to the slider control circuit 6, and the recording head 3 is driven by the slider 4. As a result, according to the signal format of FIG. 1, a track marker, a synchronizing signal modulated by a random signal, and a data signal modulated by a random signal are recorded in a master optical disk as variation of the positions of pits in the radius direction of the disk.

Additionally, it is necessary to multiply a synchronizing signal and a data signal by a random signal at constant timing. The timing is controlled by the CPU 11.

A recordable optical disk according to the signal format of FIG. 1 is manufactured in large quantities by using such a master optical disk 20 according to FIG. 1.

Figure 3:
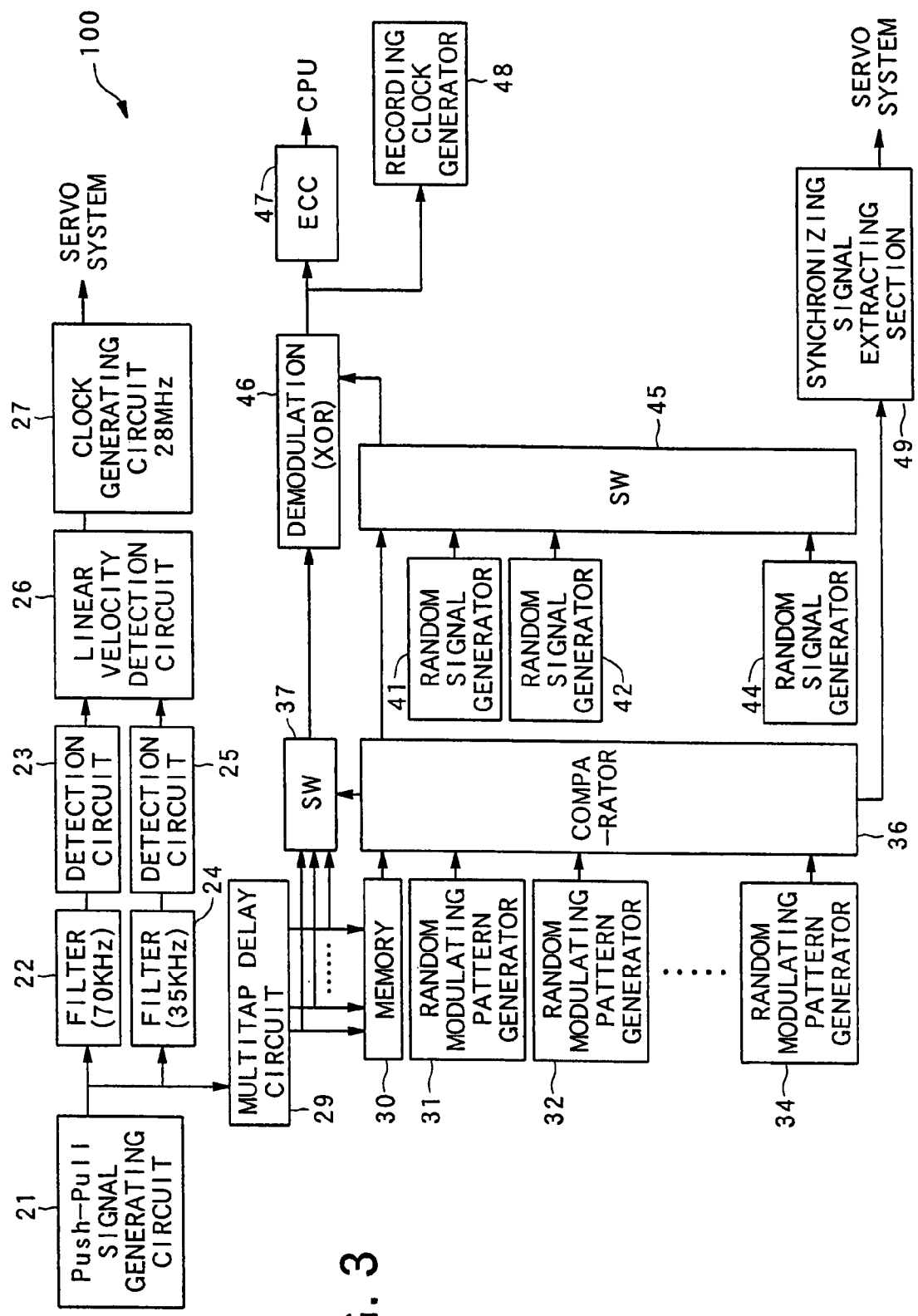
FIG. 3 is a block diagram showing the configuration of a reading apparatus in the first embodiment.

Referring to FIG. 3, the following will discuss a reading apparatus for reading information of an optical disk that is recorded according to the signal format of FIG. 1. FIG. 3 is a block diagram showing the reading apparatus. Such a reading apparatus is provided in a recorder or a reproducing device of an optical disk.

FIG. 3 shows an example of the reading apparatus of the present invention that is applied to a reproducing device of an optical disk, on which a synchronizing signal and a data signal are modulated by using four kinds of random signal patterns as described above.

As shown in FIG. 3, a reading apparatus 100 is provided with: a push-pull signal generating circuit 21 for generating a push-pull signal from an output signal of a pair of detectors; a filter 22 for passing a 70 kHz-signal; a detection circuit 23 for detecting a 70 kHz-track marker; a filter 24 for passing a 35 kHz-signal; a detection circuit 25 for detecting a 35 kHz marker; a linear velocity detection circuit 26 for detecting a linear velocity of an optical disk in response to signals from the detection circuit 23 and the detection circuit 25; a clock generating circuit 27 for generating a clock depending upon a linear speed detected by the linear speed detection circuit 26; a multitap delay circuit 29 for receiving a signal from the push-pull signal generating circuit 21 and the clock generating circuit 27; a memory 30 for storing output signal from the multitap delay circuit 29; a first sink pattern generator 31 for generating a synchronizing signal modulated by a first random modulation pattern; a second sink pattern generator 32 for generating a synchronizing signal modulated by a second random modulation pattern; a third sink pattern generator 33 for generating a synchronizing signal modulated by a third random modulation pattern; a fourth sink pattern generator 34 for generating a synchronizing signal modulated by a fourth random modulation pattern; a comparator 36 for comparing signals stored in the memory 30 and signals of the sink pattern generators 31 to 34; a switch 37 for selecting the output of the multitap delay circuit 29; a first random signal generator 41 for generating a first random signal; a second random signal generator 42 for generating a second random signal; a third random signal generator 43 for generating a third random signal; a fourth random signal generator 44 for generating a fourth random signal; a switch 45 for selecting output signals of the first to fourth random signal generators 41 to 44; a demodulator 46 for demodulating a signal selected by the switch 37; an ECC block generator 47 for generating an ECC block in response to a demodulating signal outputted from the demodulator 46; a recording clock generator 48 for generating a recording clock in response to a demodulating signal outputted from the demodulator 46; and a synchronizing signal extracting section 49 for extracting a synchronizing signal from a signal outputted from the comparator 36.

Next, the operation of the reading apparatus 100 will be discussed. In the filer 22, a 70-kHz track marker indicating an even-numbered track is extracted from a push-pull signal outputted from the push-pull signal generating circuit 21, and the track marker is detected in the marker detection circuit 23. Meanwhile, in the filter 24, a 35-kHz track marker indicating an odd-numbered track is extracted from a push-pull signal outputted from the push-pull signal generating circuit 21, and the track marker is detected in the marker detection circuit 25.

In the linear velocity detection circuit 26, a linear velocity of track reading is computed based on track markers detected in the marker detection circuit 23 and the marker detection circuit 25.

Figure 4:
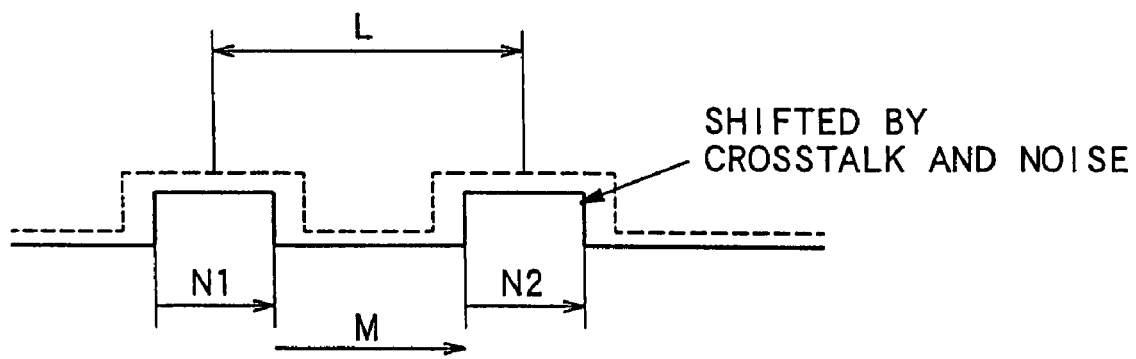
FIG. 4 is a diagram showing a method for computing a linear velocity in the first embodiment.

FIG. 4 is a diagram showing a method for computing a linear velocity. As shown in FIG. 4, a linear velocity is computed by measuring a distance (time) between the centers of crests of track markers. When adjacent crests of track markers have widths of N1 and N2 and a trough between the crests of the track markers has a width of M, distance L between the centers of the crests of the adjacent track markers is computed by the following equation.

$$L = M + (N1 + N2)/2$$

As shown in FIG. 4, a track marker is detected with a waveform which is different from an actual waveform due to the influence of crosstalk and noise. However, since the center of the crest of a track marker is used as a reference in the present embodiment, it is possible to eliminate the influence of a detected error of a track marker when a linear velocity is computed.

In the clock generating circuit 27, a clock is generated according to a linear velocity computed in the linear velocity detection circuit 26. A clock outputted from the clock generating circuit 27 is outputted to a servo system for controlling the number of revolution of a disk. Further, the clock is inputted to the multitap delay circuit 29.

In the multitap delay circuit 29, output signals of the push-pull signal generating circuit 21 are sequentially sampled in response to clocks outputted from the clock generating circuit 27, and the signal is stored in the memory 30. Moreover, the signal is outputted to the switch 37 from the push-pull signal generating circuit 21. Signals obtained by sequentially shifting phases of push-pull signals are outputted from the multitap delay circuit 29 in response to clocks outputted from the clock generating circuit 27. In this manner, since push-pull signals are stored with shifted phases, signals can be prepared without phase differences from output signals of the first to fourth random modulation pattern generators 31 to 34, and signals can be compared in the comparator 36.

In the comparator 36, signals stored in the memory 30 and signals generated in the first to fourth random modulation pattern generators 31 to 34 are compared with each other. Among signals outputted from the first to fourth random modulation pattern generators 31 to 34, when some signals match signals of the memory 30, it is determined that a push-pull signal is modulated by the corresponding randomizing pattern. Namely, in the comparator 36, comparison is made between a waveform of a signal sampled according to a clock locked to a linear velocity and four kinds of signals outputted from the random modulation pattern generators 31 to 34 to find a matching signals. When signals conform to each other, it is determined that the waveform is a synchronizing signal after modulation and is a point having conforming phases. As described above, the ECC blocks have the same synchronizing signals. Further, synchronizing signals of the ECC blocks are modulated by any of the first to fourth random signals. Therefore, one of synchronizing signals, which are outputted from the multitap delay circuit 29 and are stored in the memory 30 after modulation, always match a signal outputted from one of the first to fourth random modulation pattern generators 31 to 34.

Whether a signal matches or not is determined by a shift from a signal to be matched. A shift if detected, and when a shift is at a predetermined value or less, the signal is considered to be a matching signal. Regarding a data signal after a synchronizing signal as well, modulation is performed by using the same random series in the same ECC block. Thus, demodulation is performed by using the same random series until the first synchronizing signal of the subsequent ECC block. Further, in the case of sequential reproduction, a randomized pattern used for the subsequent ECC block is found in advance. Hence, a randomizing pattern thereof is prepared, and a phase of a synchronizing signal in each ECC and a phase of a randomizing pattern can be matched with each other relative to a front position of the ECC block where detection is made.

The comparator 36 switches a switch 37 so as to select a signal to be matched in the comparator 36 from push-pull signals outputted from the multitap delay circuit 29. Thus, a synchronizing signal and a data signal are outputted with suitable phases from the multitap delay circuit 29 via the switch 37. Further, the comparator 36 switches the switch 45 so as to select a random signal corresponding to a signal, which is a target of matching determination, among the first to fourth random modulation pattern generators 31 to 34. For example, when an output signal of the first random modulation pattern generator 31 matches a predetermined signal stored in the memory 30, a first random signal, which is an output signal of the first random signal generator 41, is selected.

As a result of comparison in the comparator 36, in the demodulator 46, a push-pull signal selected from output signals of the multitap delay circuit 29 is multiplied by a random signal selected from the first to fourth random signals. Hence, a synchronizing signal and a data signal are demodulated by a predetermined random signal and are outputted from the demodulator 46 as demodulating signals.

In the ECC block generator 47, an error is corrected in response to a demodulating signal outputted from the demodulator 46, and a signal after error correction is transmitted to a CPU (not shown). In the recording clock generator 48, a recording clock is generated in response to a demodulating signal outputted from the demodulator 46.

The synchronizing signal extracting section 49 extracts a synchronizing signal outputted from the comparator 36. A synchronizing signal extracted in the synchronizing signal extracting section 49 is outputted to a servo system for controlling the number of revolution of a disk, and the synchronizing signal is used for controlling a spindle servo and so on.

Figure 5:
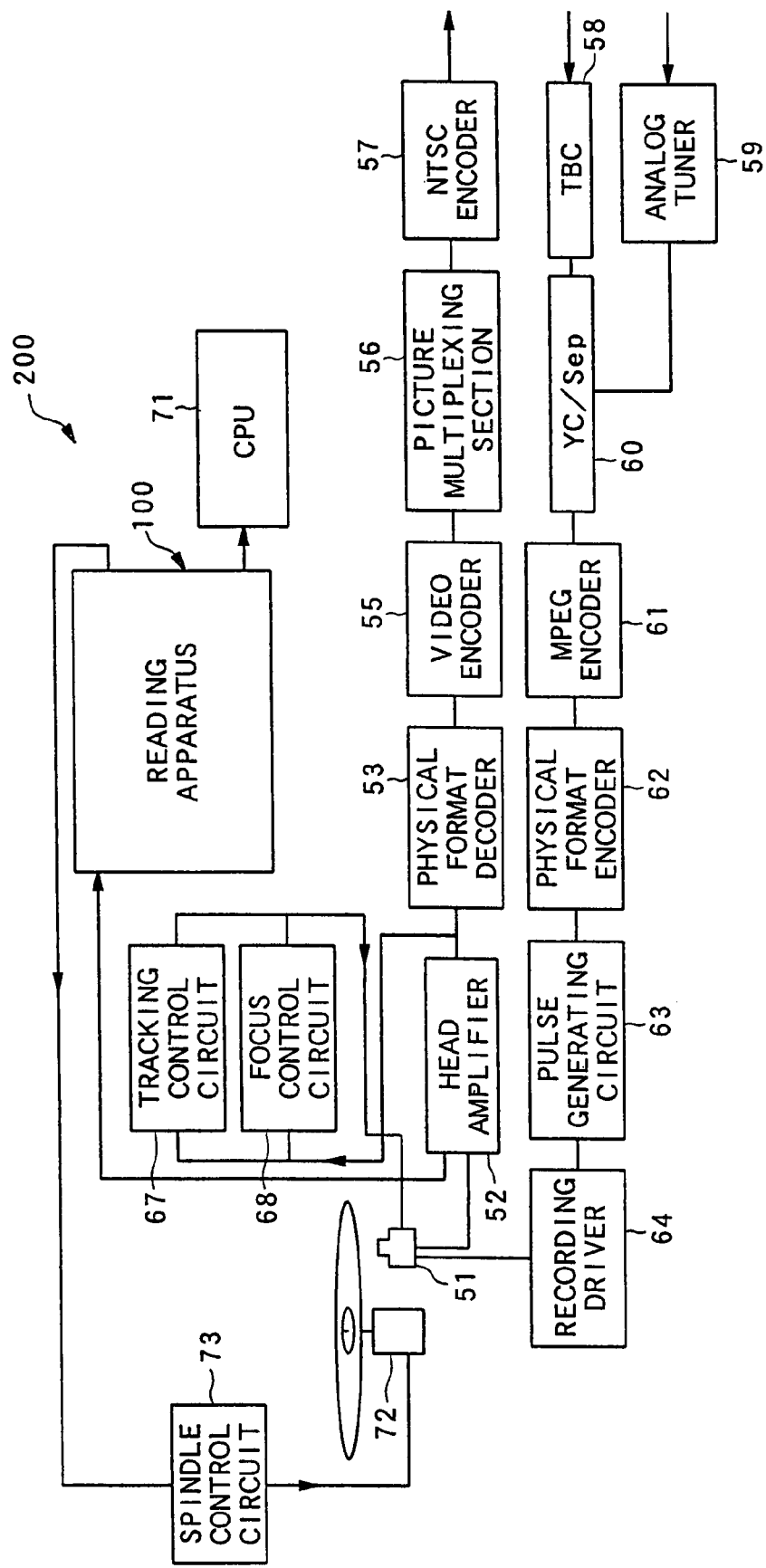
FIG. 5 is a block diagram showing the configuration of an information recording and reproducing device in the first embodiment.

Referring to FIG. 5, the following will discuss an example in which the reading apparatus 100 of FIG. 3 is applied to an information recording and reproducing apparatus. As shown in FIG. 5, as a reproducing system, an information recording and reproducing apparatus 200 is provided with: a recording and reproducing head 51; a head amplifier 52 for receiving a reproduced signal from the recording and reproducing head; a physical format decoder 53 for receiving an output signal of the head amplifier 52; a video decoder 55 for receiving an output signal of the physical format decoder 53; a graphic user interface picture multiplexing section 56 for multiplexing a graphic user interface image in response to an output signal of the video decoder 55; and an NTSC encoder 57 for performing NTSC encoding in response to an output signal of the graphic user interface picture multiplexing section 56.

Besides, as a recording system, the information recording and reproducing apparatus 200 is provided with: a time base corrector 58 for correcting synchronization of a video signal; an analog tuner 59; a separator 60 for separating a luminance signal and a color signal in response to an output signal of the time base corrector 58 and an output signal of the analog tuner 59; an MPEG encoder 61 for performing MPEG encoding in response to an output signal of the separator 60; a physical format encoder 62 for receiving an output signal of the MPEG encoder 61; a pulse generating circuit 63 for receiving an output signal of the physical format encoder 62; and a recording driver 64 for controlling laser light emitted from the recording and reproducing head 51 in response to an output signal of the pulse generating circuit 63.

Moreover, the information recording and reproducing apparatus 200 is provided with: a tracking control circuit 67 for controlling tracking of the recording and reproducing head 51 based on an output signal of the head amplifier 52; and a focus control circuit 68 for controlling focus of the recording and reproducing head 51 based on an output signal of the recording and reproducing head 51.

As shown in FIG. 5, the information recording and reproducing apparatus 200 is provided with the reading apparatus 100 of FIG. 3. A signal obtained from the recording and reproducing head 51 via the head amplifier 52 is inputted to the push-pull signal generating circuit of the reader 100. An output signal of the ECC block generator 47 is supplied to the CPU 71 for controlling the parts of the information recording and reproducing device 200. Thus, a data signal such as address information is used for controlling the information recording and reproducing apparatus 200. The data signal is included in an output signal of the ECC block generator 47. Further, output signals of the clock generating circuit 27 and the synchronizing signal extracting section 49 are transmitted to the spindle control circuit 73. The spindle control circuit 73 controls the spindle motor 72 for rotatably driving a disk.

COMPARATIVE EXAMPLE

Next, a Comparative Example will be discussed.

Figure 10:
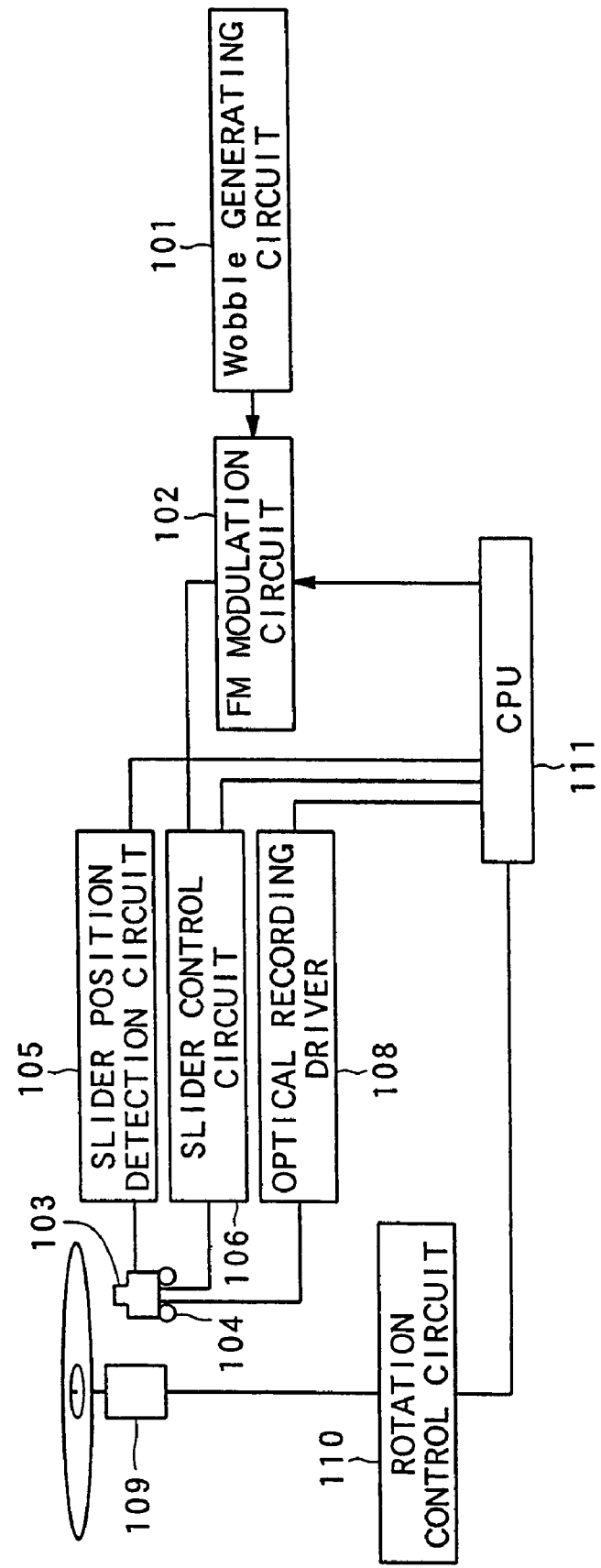
FIG. 10 is a block diagram showing a disk cutting machine for recording a wobble signal which is subjected to FM modulation.

FIG. 10 is a block diagram showing a disk cutting machine for recording a wobble signal which is subjected to FM modulation. As shown in FIG. 10, the disk cutting machine is provided with: a wobble generating circuit 101 for generating a wobble reference signal having a predetermined fundamental frequency; an FM modulating circuit 102 for performing FM modulation on the wobble reference signal; a recording head 103 for forming a groove on a master optical disk; a slider 104 for driving the recording head 103 in a radius direction of a disk; a slider position detection circuit 105 for detecting a position of the recording head 103 driven by the slider 104; a slider control circuit 106 for controlling the slider 104; an optical recording driver 108 for controlling laser light emitted from the recording head 103; a spindle motor 109 for rotatably driving a master disk; a rotation control circuit 110 for controlling the spindle motor 109; and a CPU 111 for controlling the FM modulating circuit 102, the slider position detection circuit 105, the slider control circuit 106, the optical recording driver 108, and the rotation control circuit 110.

A data signal such as address information is supplied to the FM modulating circuit 102 via the CPU 111. An unmodulated wobble reference signal outputted from the wobble generating circuit 101 is subjected to FM modulation in the FM modulating circuit 102 based on a data signal outputted from the CPU 111. A modulated signal outputted from the FM modulating circuit 102 is inputted to the slider control circuit 106. The slender 104 is driven according to a modulated signal so as to form a wobbled groove on a master disk.

Figure 8:
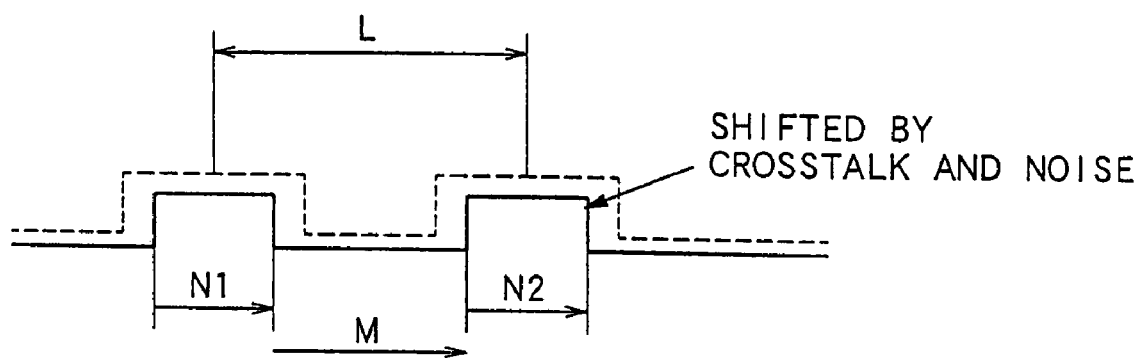
FIG. 8 is a diagram showing a method for computing a linear velocity in the second embodiment.
Figure 11A:
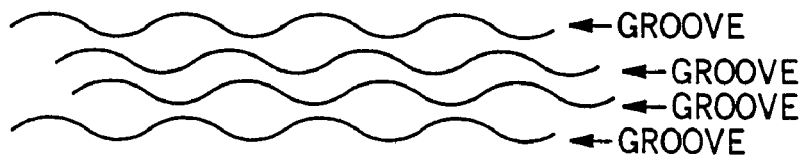
FIG. 11A is a diagram showing the shapes of the grooves of adjacent tracks.
Figure 11B:
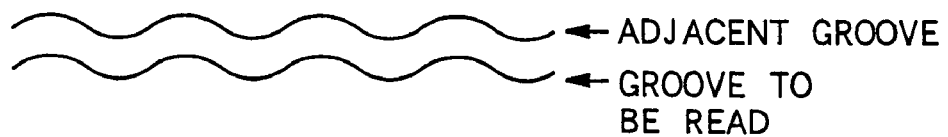
FIG. 11B is a diagram showing that adjacent tracks are in phase.
Figure 12:
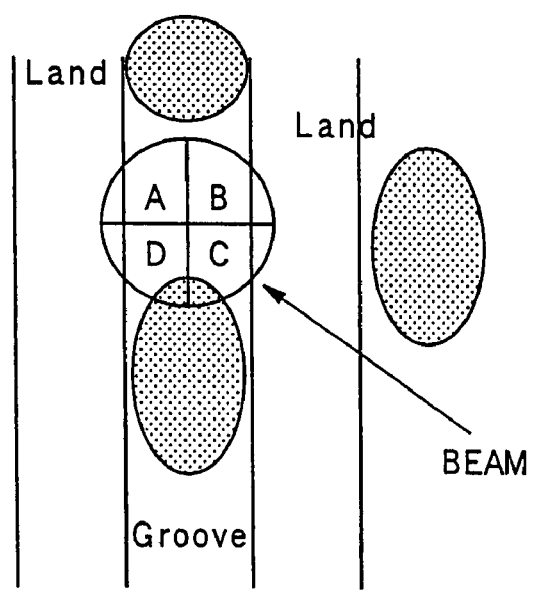
FIG. 12 is a diagram showing the positional relationship between a beam and a groove when wobble is read.

FIGS. 11A and 11B show the shapes of grooves on a plurality of adjacent tracks. FIG. 12 shows the positional relationship of a beam and a groove when a wobble is read. When a wobble signal is read, a difference between a signal corresponding to a region of A+D and a signal corresponding to a region of B+C in the beam shown in FIG. 8 is used.

In a device of the present comparative example, crosstalk caused by wobble from an adjacent track and crosstalk caused by a recording mark formed on a wobbled track enter a wobble signal. Thus, CN of a wobble signal is deteriorated, FM modulation and so on causes a problem in reading recorded data signal or results in an inaccurate wobble reference signal. Further, in a multilayer disk as well, crosstalk of a wobble signal between layers causes the same problem. Hence, it is difficult to perform accurate writing on a multilayer disk.

For example, when a track pitch is smaller, beam extends substantially to an adjacent groove and is affected by a phase of a wobble of an adjacent track. As shown in FIG. 11A, the phase relationship between adjacent grooves is changed in a complicated manner. As shown in FIG. 11B, when adjacent grooves are in phase, crosstalk, which enters a signal corresponding to the A+D region and a signal corresponding to the B+C region, is in opposite phase. Thus, a difference between a signal corresponding to the A+D region and a signal corresponding to the B+C region reaches a maximum value. When adjacent grooves are in opposite phase, crosstalk, which enters a signal corresponding to the A+D region and a signal corresponding to the B+C region, is in phase, so that a difference is a minimum value. Hence, a difference value is considerably changed by the influence of adjacent tracks.

Moreover, FIG. 12 also shows marked pits. Because of a shape of beam, a shape of a pit, aberration of a lens, crosstalk of a pit on an adjacent groove, values corresponding to mark pits of the A+D region and the B+C region do not always conform to each other. The difference is expressed in output of wobble detection.

As described above, in the method of the Comparative Example since recording of a signal is concentrated on a specific fundamental frequency (frequency of a wobble reference signal), so that when the influence of noise and crosstalk is exerted, it is difficult to detect an accurate signal.

Besides, in the above embodiment of the present invention, randomizing patters used between adjacent tracks are made different by using four kinds of randomizing patterns. The number of randomizing patterns can be suitably determined depending upon the configuration of the recording medium such that the same randomizing pattern is not used on adjacent tracks.

In the above embodiment of the present invention, an example is shown in which a plurality of randomizing patterns is prepared and is switched for each ECC block. However, a fundamental frequency of spread spectrum is changed in a short time (e.g., several tens μsec to several hundreds μsec) without using randomizing patterns. In this case as well, data is randomized in each switching, and the same effect can be obtained as switching of a randomizing pattern in that the influence of crosstalk is reduced.

In the above embodiment of the present invention, all the ECC blocks have the same synchronizing signals, and modulation is performed on a synchronizing signal and a data signal in each ECC block by using the same randomizing pattern. However, the following configuration is also applicable: the ECC blocks use different synchronizing signals, and a synchronizing signal and a data signal in the same ECC block use different randomizing patterns. Arrangement is made such that the same randomizing patterns are not arranged between adjacent tracks. In this case, a random signal can be demodulated by allowing a synchronizing signal to correspond to a randomizing pattern used for a data signal.

According to such a configuration, a circuit used for reading a synchronizing signal and a data signal is complicated. Since a synchronizing signal and a data signal have different occupied bands, it is possible to reduce the influence of crosstalk on a synchronizing signal from a data signal. Hence, it is possible to improve accuracy of reading a synchronizing signal.

In the above embodiment of the present invention, occupied bands of randomizing patterns between adjacent tracks are not limited. The influence of crosstalk between adjacent tracks can be further reduced by separating occupied bands of randomizing patterns between adjacent tracks.

In the above embodiment of the present invention, random data is produced for a synchronizing signal and a data signal, and a track marker is recorded without randomization. However, all data may be randomized. In this case, a data extracting clock is generated by using a clock control circuit, which uses a PLL, and a revolution detector, and data can be obtained by the same method.

Second Embodiment

Next, referring to FIGS. 6 to 9, the following will discuss a second embodiment of an information recording medium according to the present invention.

A signal format of this embodiment is almost the same as that of the first embodiment shown in FIG. 1. However, the synchronizing signal and substantial data except the marker are randomized based on a predetermined random signal, and are each recorded as variation of the positions of pits in the circumferential direction (the direction of a pit reading) of a disk, that is, in the circumferential direction of the disk against a track formed in a spiral fashion. For example, when a pit is positioned forward in the direction of the pit reading (the advance side in time-axis), a mark "0" is assigned. When a pit is positioned backward in the direction of the pit reading (the delay side in time-axis), a mark "1" is assigned.

In the embodiment, any one of a lead-in area, a lead-out area and a data area can be used for an area where information is recorded by means of shifting the positions of pits to the direction of the pit reading on the track. However, since the shift of the positions of pits to the direction of the pit reading increases jitter, it is desirable to avoid the data area for using as the area. For example, when copy control information is recorded, it is necessary to read this information first. Therefore, the lead-in area is most desirable for the area.

It is noted that recording predetermined RF information (e.g., video information and voice information) is recorded in the data area as the length of pits and a reference code and control data are recorded in the lead-in area as the length of pits.

In the present embodiment, a single randomizing pattern is used, and in total. A synchronizing signal and a data signal are each randomized repeatedly by using the same randomizing pattern by 16 ECC blocks. The length of the randomizing pattern is not limited to the example of the embodiment. However, it is desirable to set the length of the randomizing pattern so that the same random signals are not overlapped between adjacent tracks. Hence, it is possible to reduce crosstalk between adjacent tracks more effectually. For example, the length (the number of the ECC block) can be set so that the same random signals are not overlapped between adjacent tracks in one recording layer.

A plurality of randomizing patterns may be used. In this case, a randomizing pattern in each ECC block should be selected so that different randomizing patterns are used for adjacent tracks as much as possible. As a result, it is possible to reduce crosstalk between adjacent tracks more effectually.

In this specification, "adjacent tracks" mean tracks located in the position becoming a cause of crosstalk such as adjacent tracks in one layer or tracks formed in almost same areas in adjacent layers in a single-layer or multi-layer recording medium.

As described above, in the present embodiment, when the positions of pits is modulated in the direction of the pit reading, spread spectrum system is used, a data signal including an error correction signal is modulated by a specific random signal, and the data is modulated by the signal. As a result, the data recorded as the positions of pits in the direction of the pit reading is randomly modulated.

During reproduction, demodulation is performed by using a specific random signal from a reproduced signal so as to remove noise entering from an adjacent track and take out a data signal. In the event of an error, correction is made by an error correction signal in the ECC block so as to obtain more correct data as compared with the conventional art.

The kind of a random signal is not limited to the above, so that any kind of signal can be selected as a random signal. However, in the case of using a plurality of random signals, it is desirable to frequently switch a plurality of random signals such that random signals used for data in adjacent tracks are different from each other.

In this case, as described above, crosstalk between adjacent tracks can be reduced more effectively.

In the embodiment, a track marker is recorded as the positions of pits. However, a track maker may be recorded through the use of the length of pits or wobbling of a track itself. A track maker may be omitted. In this case, it is possible to generate a synchronizing signal and so on through the use of detected signals of pits in which data is recorded.

In the present invention, only a synchronizing signal and a data signal are randomized and recorded. A track marker is recorded without randomization. Thus, a circuit is not complicated in an information recorder for recording information in an optical disk or in an information reproducing device for reproducing information recorded in an optical disk. However, all data including a track marker may be randomized and recorded.

Moreover, when a track marker is not randomized, in order to increase accuracy of reading on a marker not being randomized, it is more effective to raise a modulation factor (amplitude factor) of a groove on the part.

Referring to FIG. 6, the following will discuss the configuration of a disk cutting machine for manufacturing a master disk.

As shown in FIG. 6A, the cutting machine is provided with: a random signal generating circuit 1 for generating a random signal; a modulator 2 for multiplying a synchronizing signal and a data signal having the above-mentioned signal format by a random signal; a recording head 3 for forming grooves on a master optical disk 20; a slider 4 for driving the recording head 3 in a radius direction of the disk; a slider position detection circuit 5 for detecting a position of the recording head 3 in a radius direction of the disk; a slider control circuit 6 for controlling a sliding position of the slider 4; an optical recording driver 8 for controlling laser light emitted from the recording head 3; a drive 9 for rotatably driving the master disk; a rotation control circuit 10 for controlling the drive 9; and a CPU 11 for controlling the random signal generating circuit 1; the modulator 2; the slider position detection circuit 5; the slider control circuit 6; the optical recording driver 8; and the rotation control circuit 10.

FIG. 6B to 6D shows an example of configuration of a time-axis shit section 12. In an example of FIG. 6D, an output signal from a strategy LSI 12*a* which receives data from a CPU 11 is modulated on a time-axis by a time-axis modulation circuit 12*b*. The strategy LSI 12*a* determines whether inputted data is a predetermined data or not, and eliminates abnormal data. Usually, the strategy LSI 12*a* has a re-sampling mechanism, and controls timing to output data. Therefore, if such a strategy LSI 12*a* having a re-sampling mechanism is used, it is necessary to provide a time-axis modulation circuit in the output side of the strategy LSI as shown in FIG. 6B.

FIG. 6C shows an example that an adder 12*c* is provided in place of the time-axis modulation circuit 12*b*. Generally, if a recording power of a laser is increased, a recording mark becomes larger. Therefore, by adding a modulated signal from a modulator 2 to an output signal of the strategy LSI 12*a*, it is possible to obtain a predetermined modulation as is the case modulation is performed with respect to a time-axis. A subtracter may be used in place of an adder.

FIG. 6D shows an example that a time-axis modulation circuit 12*b* is provided at the front stage of a strategy LSI 12*a* not having re-sampling mechanism. In this case, since re-adjustment of time-axis is not performed in the strategy LSI, it is possible to perform a time-axis modulation at the front stage.

Next, an operation of a cutting machine will be explained.

As shown in FIG. 6A, A track marker to be recorded in the Marker, a synchronizing signal to be recorded in the Sync and a data signal to be recorded in Data are outputted to the modulator 2 via the CPU 11. On the other hand, in the random signal generating circuit 1, a random signal having a bandwidth of 280 kHz to 2.8 MHz is generated, and outputted to the modulator 2.

In the modulator 2, the data outputted from the CPU 11 is multiplied by a random signal as necessary, which is outputted from the random signal generating circuit 1. As described above, in the present embodiment, only a synchronizing signal and a data signal are multiplied by a random signal before randomization.

An output signal of the modulator 2 is inputted to the time-axis shit section 12, a time-axis of data is modulated according to a modulated signal in the time-axis shit section. When a laser beam is irradiated on the basis of the output signal of the time-axis shit section 12 by a optical recording driver 8, a track marker, a synchronizing signal modulated by a random signal, and a data signal modulated by a random signal are recorded in a master optical disk as variation of the positions of pits in the circumferential direction of the disk (the direction of the pit reading).

Additionally, it is necessary to multiply a synchronizing signal and a data signal by a random signal at constant timing. The timing is controlled by the CPU 11.

A recordable optical disk according to the signal format of FIG. 1 is manufactured in large quantities by using such a master optical disk 20 according to FIG. 1.

Referring to FIG. 7, the following will discuss a clock generating apparatus for reading information recorded in the optical disk according to the signal format of FIG. 1 and generating a clock. FIG. 7 is a block diagram showing the clock generating apparatus. Such a clock generating apparatus is provided in a recorder or a reproducing device of an optical disk.

The reading apparatus shown in FIG. 7 is applied to a reproducing device of an optical disk, on which a synchronizing signal and a data signal are modulated by using a random signal pattern as described above.

As shown in FIG. 7, a reading apparatus 100 is provided with: a filter 22 for passing a 70 kHz-signal; a detection circuit 23 for detecting a 70 kHz-track marker; a filter 24 for passing a 35 kHz-signal; a detection circuit 25 for detecting a 35 kHz marker; a linear velocity detection circuit 26 for detecting a linear velocity of an optical disk in response to signals from the detection circuit 23 and the detection circuit 25; and a clock generating circuit 27 for generating a clock depending upon a linear speed detected by the linear speed detection circuit 26.

Next, the operation of the reading apparatus 100 will be discussed. In the filer 22, a 70-kHz track marker indicating an even-numbered track is extracted from an RF signal, and the track marker is detected in the marker detection circuit 23. Meanwhile, in the filter 24, a 35-kHz track marker indicating an odd-numbered track is extracted from a push-pull signal outputted from the push-pull signal generating circuit 21, and the track marker is detected in the marker detection circuit 25.

In the linear velocity detection circuit 26, a linear velocity of track reading is computed based on track markers detected in the marker detection circuit 23 and the marker detection circuit 25.

In this embodiment, a method for computing a linear velocity is the same as that of the first embodiment. As shown in FIG. 8, a linear velocity is computed by measuring a distance (time) between the centers of crests of track markers. When adjacent crests of track markers have widths of N1 and N2 and a trough between the crests of the track markers has a width of M, distance L between the centers of the crests of the adjacent track markers is computed by the following equation.

$$L = M + (N1 + N2)/2$$

As shown in FIG. 8, a track marker is detected with a waveform which is different from an actual waveform due to the influence of crosstalk and noise. However, since the center of the crest of a track marker is used as a reference in the present embodiment, it is possible to eliminate the influence of a detected error of a track marker when a linear velocity is computed.

In the clock generating circuit 27, a clock is generated according to a linear velocity computed in the linear velocity detection circuit 26. A clock outputted from the clock generating circuit 27 is outputted to a servo system for controlling the number of revolution of a disk.

Figure 9:
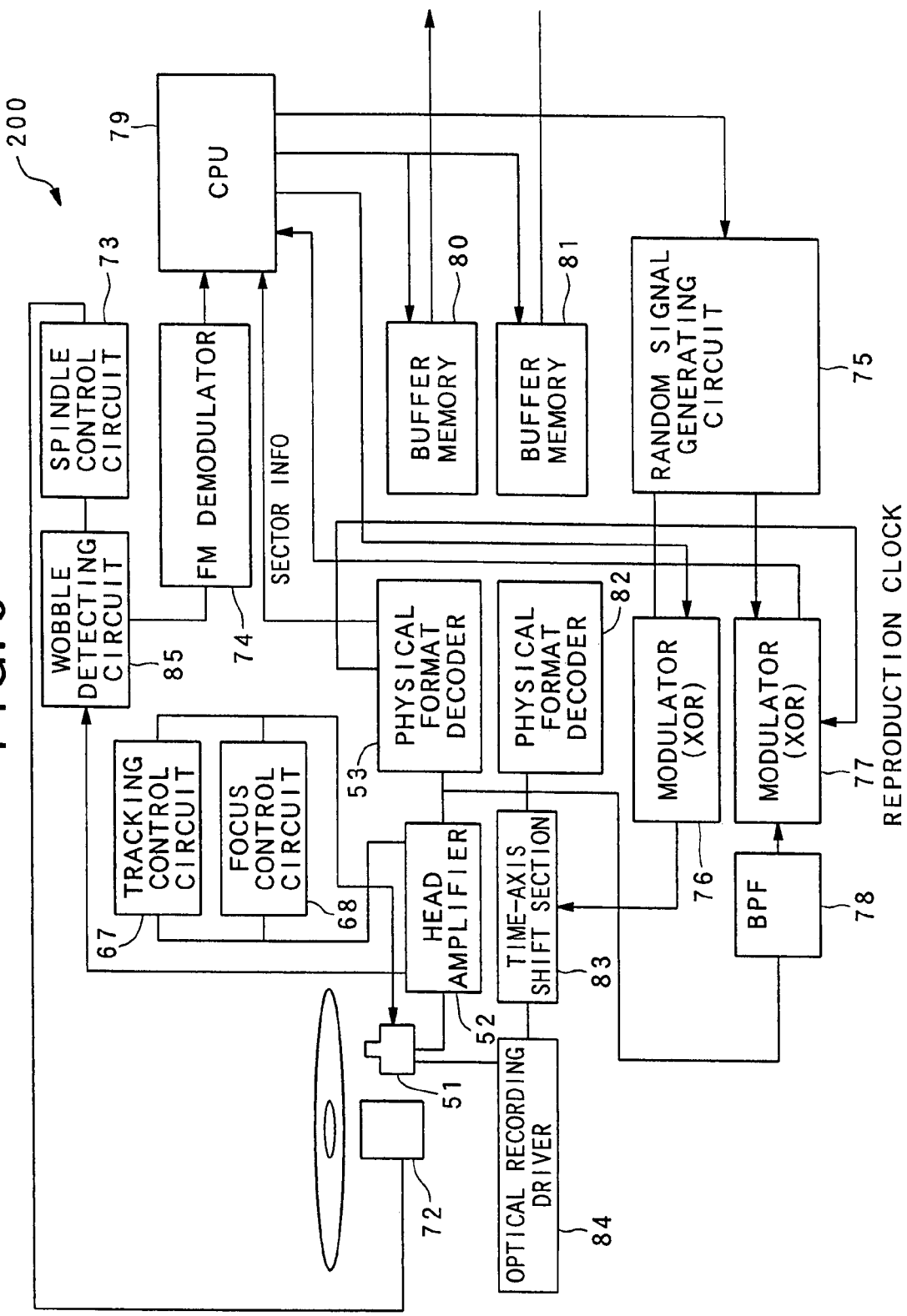
FIG. 9 is a block diagram showing the configuration of an information recording and reproducing device in the second embodiment.

Referring to FIG. 9, the following will discuss an example in which the information recording and reproducing apparatus having the clock generating apparatus 100 of FIG. 7. As shown in FIG. 9, as a reproducing system, an information recording and reproducing apparatus 200 is provided with: a recording and reproducing head 51; a head amplifier 52 for receiving a reproduced signal from the recording and reproducing head; a physical format decoder 53 for receiving an output signal of the head amplifier 52; and a buffer memory 80 for receiving an output signal of the physical format decoder 53. The physical format decoder 53 is provided with the above-mentioned clock generating apparatus 100.

As a recording system, a buffer memory 81 for storing data in sequence; a physical format encoder 82 for receiving data from the buffer memory 81; a time-axis shift section 83 for receiving an output signal of the physical format encoder 82; and an optical recording driver 84 for controlling a laser beam irradiated from the recording and reproducing head 51. The time-axis shift section 83 is configured as with the time-axis shift section 12 shown in FIGS. 6A to 6D.

The information recording and reproducing apparatus 200 is provided with: a tracking control circuit 67 for controlling tracking of the head amplifier 52; a focus control circuit 68 for controlling focus of the recording and reproducing head 51 based on an output signal of the recording and reproducing head 51; a wobble detecting circuit 85 for receiving the output signal of the head amplifier 52 and detecting a wobble signal; a spindle control circuit 73 for receiving an output signal from the wobble detecting circuit 85 and controlling a spindle motor 72; and an FM modulator 74 for receiving an output signal of the spindle control circuit 73 and performing FM modulation.

The information recording and reproducing apparatus 200 is also provided with: a random signal generating circuit 75 for generating a randomizing signal; a modulator 76 for performing modulation (XOR modulation) of data by using the randomizing signal from the random signal generating circuit 75; demodulator 77 for performing demodulation (XOR demodulation) of data by using the randomizing signal from the random signal generating circuit 75; a band path filter 78 connected to an input side of the demodulator 77; and a CPU 79 for controlling each section of the information recording and reproducing apparatus 200.

Next, an operation of the information recording and reproducing apparatus 200 will be explained.

An output signal from the head amplifier 52 is inputted to the wobble detecting circuit 85. The spindle controlling circuit 73 performs a feedback control with respect to a spindle motor based on a wobble signal detected by the wobble detecting circuit 85 and controls the number of revolutions of the disk so as to keep it at a predetermined value. The wobble signal detected by the wobble detecting circuit 85 is demodulated by the FM demodulator 74. Hence, a predetermined data which is recorded by means of FM modulation is demodulated, and the demodulated data is inputted to the CPU 79.

During reproduction of information, reproduction signals of data pits recorded in the disk is sent to the physical format decoder 53 and the band path filter 78 via the head amplifier 52. In physical format decoder 53, data such as a sector ID is detected and sent to the CPU 79, and a reproduction clock is generated by the clock generating apparatus 100. Data recorded in data pits is stored in the buffer memory 80 in sequence.

On the other hand, the reproduction signals of data pits inputted to the band path filter 78 is sent to the demodulator 77. The reproduction clock generated by the clock generating apparatus 100 in the physical format decoder 53 and the randomizing signal generated by the random signal generating circuit 75 are supplied to the demodulator 77. In demodulator 77, data outputted from the band path filter 78 is multiplied by the randomizing signal at a predetermined timing, so that the data is restored. The restored data is sent to the CPU 79. In this example, randomizing of a signal is performed by a unit of 16 ECC blocks, so that it is possible to determine which sector is reproduced currently on the basis of information form the physical format decoder. If a sector number is determined, it is possible to specify which part of the randomizing signal corresponds to the modulation of the time-axis. Therefore, it is possible to multiply the randomizing signal by data at a precise timing, so that the data can be restored. Hence, by performing a demodulation (XOR) of data having passed through the band path filter 78 by using a known randomizing signal, noises entering data becomes out of band, so that only an original data is demodulated and sent to the CPU 79.

On the other hand, during recording of information, data read out from the buffer memory 81 in sequence is inputted to the physical format encoder 82, and an output signal of the physical format encoder 82 is supplied to the time-axis shift section 83. As shown in FIG. 5, a randomizing signal from the random signal generating circuit 75 is supplied to the demodulator 76. In the demodulator 76, the randomizing signal is multiplied by data inputted from the CPU79. The data modulated by means of multiplying is supplied to the time-axis shift section 83. In the time-axis shift section 83, a signal from the physical format encoder 82 is adjusted with respect to a time-axis according to the demodulated signal from the modulator 76. The output signal of the time-axis shift section 83 is inputted to the optical recording driver 64, and predetermined information is recorded in the disk as variation of positions of pits in the direction of the pit reading.

As described above, in the present invention, by modulating a mark in the direction of the pit reading (circumferential direction of the disk) at the time of recording, it is possible to perform a data multiplexing safely. Particularly, in the recording in a high density recording medium such as a DVD, for example, data is converted to a signal in a pulsed form by means a pattern and recorded with a pattern generator referred to as a strategy. Therefore, in the case of copying data bodily (RF copying), re-sampling is performed in order to improve jitter. As a result, modulated data in the direction of mark reading is lost, so that it is possible to achieve a very secure system compared to the above mentioned Comparative Example.

In the above embodiment of the present invention, a single randomizing pattern is used repeatedly. However, randomizing patterns used between adjacent tracks are made different by using a plurality of randomizing patterns. In this case, the number of randomizing patterns can be suitably determined depending upon the configuration of the recording medium such that the same randomizing pattern is not used on adjacent tracks.

In the case of using a plurality of randomizing patterns, the patterns may be switched for each ECC block. However, a fundamental frequency of spread spectrum is changed in a short time (e.g., several tens μsec to several hundreds μsec) without using randomizing patterns. In this case as well, data is randomized in each switching, and the same effect can be obtained as switching of a randomizing pattern in that the influence of crosstalk is reduced.

In the above embodiment of the present invention, all the ECC blocks have the same synchronizing signals, and modulation is performed on a synchronizing signal and a data signal in each ECC block by using the same randomizing pattern. However, the following configuration is also applicable: the ECC blocks use different synchronizing signals, and a synchronizing signal and a data signal in the same ECC block use different randomizing patterns. Arrangement is made such that the same randomizing patterns are not arranged between adjacent tracks. In this case, a random signal can be demodulated by allowing a synchronizing signal to correspond to a randomizing pattern used for a data signal.

According to such a configuration, a circuit used for reading a synchronizing signal and a data signal is complicated. Since a synchronizing signal and a data signal have different occupied bands, it is possible to reduce the influence of crosstalk on a synchronizing signal from a data signal. Hence, it is possible to improve accuracy of reading a synchronizing signal.

In the above embodiment of the present invention, occupied bands of randomizing patterns between adjacent tracks are not limited. The influence of crosstalk between adjacent tracks can be further reduced by separating occupied bands of randomizing patterns between adjacent tracks.

In the above embodiment of the present invention, random data is produced for a synchronizing signal and a data signal, and a track marker is recorded without randomization. However, all data may be randomized. In this case, a data extracting clock is generated by using a clock control circuit, which uses a PLL, and a revolution detector, and data can be obtained by the same method.

In the above embodiment, data is randomized by means of a random signal. However, a frequency hopping may used as another spread spectrum technology, and it is possible to have the same effect.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Applications No. 2001-279396 filed on Sep. 14, 2001 and No. 2001-378873 filed on Dec. 12, 2001 including the specification, claims, drawings and summary is incorporated herein by reference in its entirety.

What is claimed is:

1. An optical disc in which recording information is recorded as a line of recording marks,
   wherein the line of the recording marks is wobbled by modulating a position of the recording marks in a radius direction intersecting a direction of reading of the recording marks by means of a spread spectrum system, and
   a key necessary for removing copy prohibition is recorded as variation of modulated positions of the recording marks in a radius direction,
   wherein the positions of the recording marks are modulated by changing a fundamental frequency of a signal used for the spread spectrum system in a short period.

2. The optical disc according to claim 1, wherein the positions of the recording marks are modulated by using a randomizing pattern of the spread spectrum system.

3. The optical disc according to claim 2, wherein the randomizing pattern is different between adjacent tracks.

4. The optical disc according to claim 2, wherein the information, the positions of which are modulated, is divided into units each having a time length of a predetermined period, and the same randomizing pattern is used in each unit.

5. The optical disc according to claim 4, wherein the unit is an ECC block.

6. The optical disc according to claim 4, wherein the unit is equal to a data error correction unit of a recording mark.

7. The optical disc according to claim 2, wherein the information, the positions of which are modulated, is divided into units each having a time length of a predetermined period, and the signal having the same fundamental frequency is used in each unit.

8. The optical disc according to claim 2, wherein two or more kinds of randomizing patterns are used with different occupied bands, and randomizing patterns are used with different occupied bands between adjacent tracks.

9. The optical disc according to claim 1, wherein a track marker is not modulated.

10. The optical disc according to claim 9, wherein different modulation factors are used between a part corresponding to the modulated positions and the other part corresponding to the position not being modulated.

11. The optical disc according to claim 10, wherein a modulation factor of the other part corresponding to the position not being modulated is larger than that of the part corresponding to the modulated positions.

12. The optical disc according to claim 1, wherein the information, the positions of which are modulated, includes a modulated specific synchronizing signal.

13. The optical disc according to claim 12, wherein the information, the positions of which are modulated, further includes substantial data that is modulated with the same randomizing pattern as that of the modulated specific synchronizing signal.

14. The optical disc according to claim 1, wherein the positions of the recording marks are modulated by using signals having different fundamental frequencies between adjacent tracks.

15. The optical disc according to claim 1, wherein the information, the positions of which are modulated, includes a synchronizing signal.

16. The optical disc according to claim 1, wherein the recording mark is a pit.

17. The optical disc according to claim 1, wherein the spread spectrum system is a system in which the information is spread to a predetermined frequency band.

* * * * *